United States Patent

[11] 3,600,802

[72] Inventors George N. Jorgensen;
 Harris I. Stanback, both of Lexington, Ky.
[21] Appl. No. 842,776
[22] Filed June 26, 1969
[45] Patented Aug. 24, 1971
[73] Assignee Square D Company
 Park Ridge, Ill.
 Continuation of application Ser. No.
 518,809, Jan. 5, 1966, now abandoned.

[54] INSULATED BUS BAR AND METHOD OF MAKING
 6 Claims, 8 Drawing Figs.
[52] U.S. Cl............................................... 29/624,
 264/339, 264/285, 339/22 B, 156/218, 18/19 B,
 174/5
[51] Int. Cl....................................................H01b 13/00,
 H05k 3/00
[50] Field of Search............................................ 29/624;
 156/54, 304, 218, 53; 264/285, 339; 339/22 B;
 174/5, 91, 92, 93; 18/19 B, 19 E

[56] References Cited
UNITED STATES PATENTS

| | | | |
|---|---|---|---|
| 607,415 | 7/1898 | Robinson | 264/339 |
| 2,108,023 | 2/1938 | Salemme | 264/285 |
| 2,653,991 | 9/1953 | Dyer | 339/22 B |
| 2,749,180 | 6/1956 | Andrews | 156/218 |
| 2,960,725 | 11/1960 | Lefevre | 264/285 |
| 3,042,889 | 7/1962 | Johnston | 339/22 B |

Primary Examiner—John F. Campbell
Assistant Examiner—Donald P. Rooney
Attorneys—Harold J. Rathbun and Paul J. Rose ABSTRACT: Methods of making insulated bus bars using flat, non-self-conforming insulating film as insulation. One or more strips of insulating film are fed through various work stations in which the strips are formed into a generally U-shaped cross section, heated on the inside of the U-shaped cross section, formed into a sleeve corresponding to the shape of a bus bar and having overlapping longitudinal edge portions, heated on the outside, cooled, and cut to length. A bus bar is then inserted transversely in the formed sleeve.

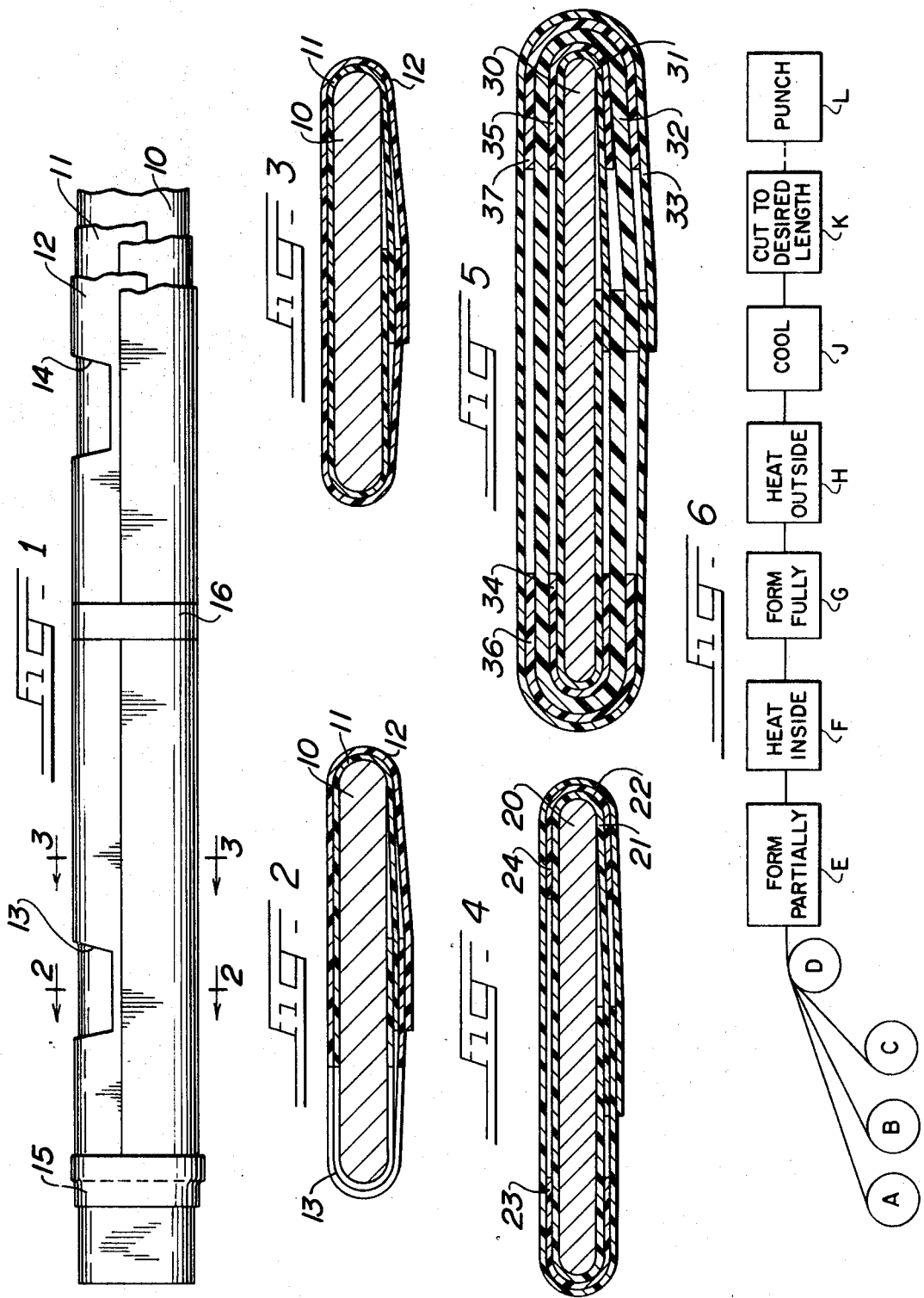

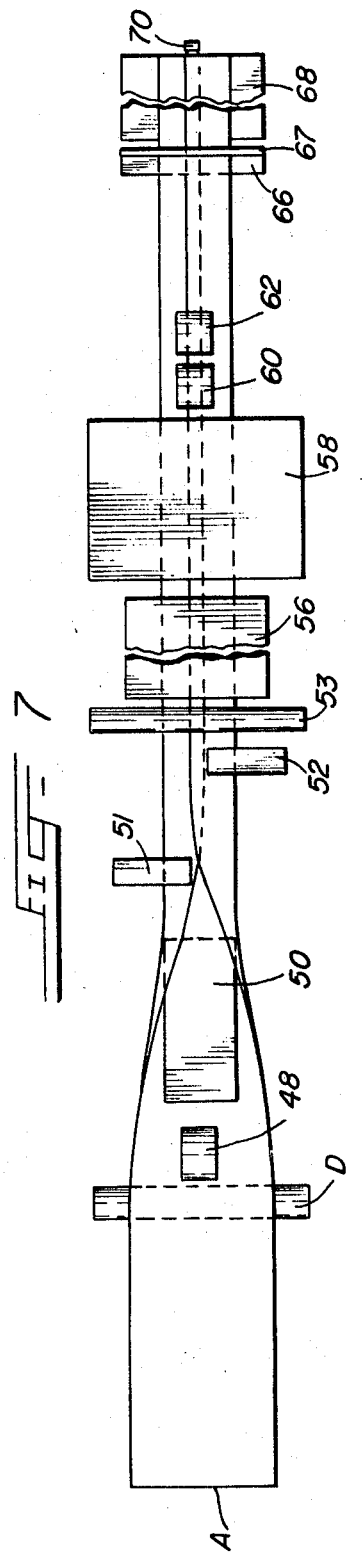
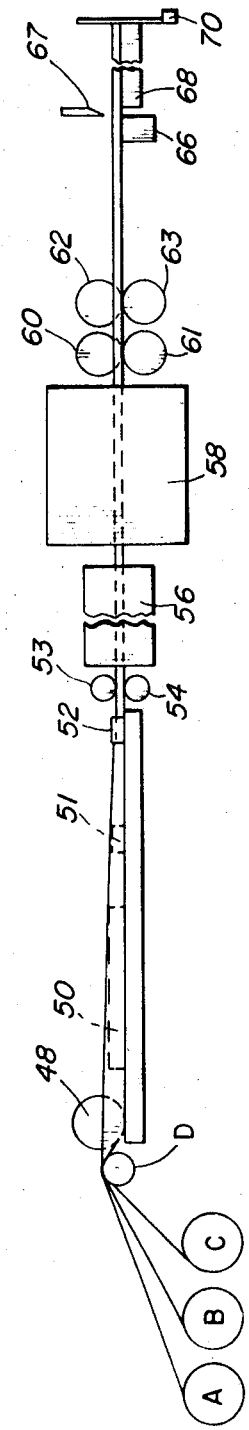

INSULATED BUS BAR AND METHOD OF MAKING

This is a continuation of application Ser. No. 518,809, filed Jan. 5, 1966 now abandoned.

This invention relates to electrical insulating systems for bus bars and to methods of forming insulation and applying it to the bus bars.

Objects of the invention are to provide improved insulating systems for bus bars and to provide methods of making insulating film sleeves of a cross-sectional shape corresponding to the cross-sectional shape of a bus bar from flat, non-self-conforming insulating film stock.

In the drawings, FIG. 1 is a fragmentary side vie of a bus bar insulated in accordance with the invention;

FIG. 2 is a sectional view taken along the line 2—2 of FIG. 1;

FIG. 3 is a sectional view taken along the line 3—3 of FIG. 1;

FIGS. 4 and 5 are sectional views similar to FIG. 3 but showing bus bars with modified insulating systems;

FIG. 6 is a schematic diagram illustrating various steps in the forming of the insulation for the bus bar of FIG. 4;

FIGS. 7 and 8 are schematic diagrams more explicitly illustrating the steps of the process of FIG. 6, FIG. 7 being a top plan view and FIG. 8 being a side elevational view.

In the drawings, FIGS. 1-3 show a bus bar 10 having a pair of insulating filmstrips 11 and 12 wrapped therearound. The strips 11 and 12 are preferably formed of a polyester material, such as Mylar, which is strong and durable and has a relatively high dielectric strength, and may be notched at intervals, as at 13 and 14, to expose portions of the bus bar 10 and thus render it suitable for use in bus duct of the plug-in type. Opposite ends of the strips 11 and 12 may be taped to the bus bar 10, as at 15 of FIG. 1 where only one end of the strips 11 and 12 is shown, to predetermine the location of the notches 13 and 14 with respect to the ends of the bus bar. If desired, the strips 11 and 12 may also be taped at intervals between opposite ends, as at 16. Each of the strips 11 and 12 is wrapped substantially once around the bar 10, the longitudinal edge portions preferably overlapping as shown.

When bus duct is of the type wherein opposite edge portions of the bus bars are received in the corrugations of a corrugated housing, additional insulation is required at the edge portions of the bus bars. FIGS. 4 and 5 show insulating systems having such additional insulation. FIG. 4 shows a bus bar 20 having a pair of insulating filmstrips 21 an 22, like or similar to the strips 11 and 12, wrapped substantially once therearound, the longitudinal edge portions preferably overlapping as shown. In addition, the opposite edge portions of the bus bar 20 are provided respectively with a pair of insulating tape strips 23 and 24 preferably formed of vinyl or mica tape and disposed between the insulating filmstrips 21 and 22.

FIG. 5 shows a bus bar 30 having three insulating filmstrips 31, 32, and 33, like or similar to the strips 11 and 12, wrapped substantially once therearound, the longitudinal edge portions preferably overlapping as shown. In addition, the opposite edge portions of the bus bar 30 are provided respectively with pairs of insulating tape strips 34, 35, 36, and 37 preferably formed of vinyl or mica tape, the strips 34 and 35 being disposed on opposite edge portions of the bus bar 30 between the insulating filmstrips 31 and 32, and the strips 36 and 37 being disposed on opposite edge portions of the bus bar 30 between the insulating filmstrips 32 and 33.

The thickness of the insulating filmstrips and the insulating tape strips are exaggerated in the drawings. As provided in commercially produced bus duct, the strips 11, 12, 21, 22, 23, 24, and 32 are about ten-thousandths of an inch thick, and the strips 31, 33, 34, 35, 36, and 37 are about five-thousandths of an inch thick.

As furnished to the bus duct manufacturer, the polyester film is non-self-conforming. That is, it tends to remain flat after being unrolled from a coil and to return to a flat condition after being formed transversely around a bus bar. By the heating, forming, cooling, and cutting process of this invention the flat strip of polyester film as furnished from a coil is transformed into sleeves having a cross-sectional shape conforming to the cross-sectional shape of a bus bar and a length corresponding to the desired insulated length of a bus bar.

FIG. 6 schematically illustrates the steps used in the formation of the insulating system for the bus bar of FIG. 4 and the sequence of those steps, it being understood that certain heating and forming steps may overlap or be performed simultaneously if desired. In FIG. 6, items A and C represent coils of polyester film from which the wider strips 21 and 22 are respectively formed and item B represents two horizontally spaced coils of insulating tape from which the narrower strips 23 and 24 are formed. The strips of polyester film from the coils A and C and the strips of tape from the two coils of item B are fed manually or in any other suitable conventional manner over a guide roller D into a work station E. At the work station E another guide roller, or equivalent means commonly used to form flat flexible material into a U-shaped cross section, forms the composite insulation of the two strips of polyester film with the two spaced strips of tape therebetween into a generally U-shaped cross section. From the work station E the composite insulation passes into a work station F, where it is heated by any suitable heating means on the inside of the U-shaped cross section, and then into a work station G, where it is formed fully into the shape of the bus bar 20 by further guiding means, as is well known in the art of folding of such flexible material. The composite insulation then passes into a work station H, where it is heated from the outside by any suitable heating means, and into a work station J, where it is cooled in an airstream. Finally, the composite insulation passes to a work station K where it is cut to desired length.

When the composite insulation is to be used on a bus bar for plug-in bus duct, the formed and cut lengths may then be placed in a punch press L for the punching of apertures therein, such as the apertures 13 and 14 of FIGS. 1 and 2. The composite insulation is normally applied to a bus bar by manually unfolding the sleeves of polyester film slightly and inserting the bus bar therein transversely.

Although the specific means that may be used for performing the foregoing steps are each well known in the art, FIGS. 7 and 8 are included to illustrate the process of FIG. 6 more explicitly. The work station E of FIG. 6 is represented in FIGS. 7 and 8 as a forming roller 48 so positioned with respect to the guide roller D as to depress the central portion of the composite strip thereby to form the composite strip into a generally U-shaped cross section. The work station F of FIG. 6 is represented in FIGS. 7 and 8 as a resistance-type electric heater 50 which heats the inside of the generally U-shaped cross section of the composite strip. Radiant heat energy could, of course, be used instead. The work station G of FIG. 6 is represented in FIGS. 7 and 8 as a pair of guide members 51 and 52, through which opposite edge portions of the composite strip are respectively strung in a folded-over condition due to the action of a pair of guide rollers 53 and 54 through which the composite strip is strung to finally be shaped as a fully formed sleeve. The work stations H and J of FIG. 6, in which the composite sleeve is respectively heated and cooled, are respectively represented in FIGS. 7 and 8 by a resistance-type electric heating unit 56 and a cooling unit 58 which may be of the airblast type. The strips are pulled from the rolls A, B, and C and the composite sleeve is pulled by two pairs of drive rollers 60 and 61, and 62 and 63. The work station K of FIG. 6 is represented in FIGS. 7 and 8 as a shear having a stationary blade 66 and a movable blade 67, a support table 68, and a limit switch 70 for controlling the shear.

We claim:

1. The method of making an insulated bus bar comprising providing a flat elongated bus bar of uniform cross section, providing an elongated strip of flat, non-self-conforming insulating film of a width somewhat greater than the perimeter of the bus bar cross section, feeding the strip successively through various work stations in which the strip is formed into a generally U-shaped cross section, heated by the directing of heat into the inside of the U-shaped cross section, formed into a sleeve of a cross-sectional shape and size corresponding to the cross-sectional shape and size of the bus bar with the bight portion of the U-shaped cross section becoming one of the wider sides of the sleeve and with the longitudinal edge portions of the strip overlapping along the other of the wider sides of the sleeve, heated by the directing of heat onto the outside of the sleeve, cooled while in the form of the sleeve, and then cut to a length corresponding generally to the length of the bus bar, and inserting the bus bar in the sleeve.

2. The method of making an insulated bus bar according to claim 1 wherein two strips of non-self-conforming insulating film are fed successively through the various work stations in superimposed relationship to provide a double-layered sleeve, and the bus bar is inserted into the double-layered sleeve.

3. The method of making an insulated bus bar according to claim 2 including providing two relatively narrow strips of insulating tape and feeding the strips of insulating tape through the various work stations between the strips of insulating film longitudinally thereof, the strips of insulating tape being spaced apart transversely of each other an spaced from the longitudinal edges of the strips of insulating film so as to be positioned along the narrower sides of the sleeve, respectively, upon formation of the sleeve.

4. The method of making an insulated bus bar according to claim 1 wherein the step of inserting the bus bar is accomplished by the unfolding of the sleeve at the overlapped longitudinal edge portions of the strip and the inserting of the bus bar transversely.

5. The method of making an insulate bus bar according to claim 1 including the additional step of punching longitudinally spaced apertures in the sleeve along a longitudinal edge portion thereof before the bus bar is inserted therein.

6. The method of making an insulated bus bar according to claim 4 including the additional step of winding a length of adhesive tape transversely around the bus bar and sleeve at one end of the sleeve to retain the bus bar and sleeve against longitudinal movement relative to each other.